(12) United States Patent
Thibault et al.

(10) Patent No.: US 8,839,918 B2
(45) Date of Patent: Sep. 23, 2014

(54) ELECTROMECHANICAL ACTUATOR WITH DUAL EXCITATION

(75) Inventors: Julien Thibault, Gif-sur-Yvette (FR); Florent Nierlich, La Garenne-Colombe (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 53 days.

(21) Appl. No.: 13/347,106

(22) Filed: Jan. 10, 2012

(65) Prior Publication Data

US 2012/0175198 A1    Jul. 12, 2012

(30) Foreign Application Priority Data

Jan. 10, 2011   (FR) ...................... 11 50151

(51) Int. Cl.
| | | |
|---|---|---|
| *F16D 65/28* | (2006.01) | |
| *H02K 7/06* | (2006.01) | |
| *H02K 11/00* | (2006.01) | |
| *F16D 55/36* | (2006.01) | |

(52) U.S. Cl.
CPC .............. *H02K 7/06* (2013.01); *H02K 11/0015* (2013.01); *H02K 11/0073* (2013.01)
USPC .............. 188/156; 188/158; 188/159

(58) Field of Classification Search
USPC ...... 188/71.5, 72.1, 156–159, 1.11 R, 1.11 E; 701/70; 318/3, 9; 244/111, 110 A
See application file for complete search history.

(56) References Cited

U.S. PATENT DOCUMENTS

| | | | | |
|---|---|---|---|---|
| 4,928,028 | A  * | 5/1990 | Leibovich | ........................ 310/23 |
| 7,349,787 | B2 * | 3/2008 | Thibault | ........................ 701/70 |
| 7,597,407 | B2 * | 10/2009 | Yamaguchi et al. | ........... 303/20 |
| 8,235,181 | B2 * | 8/2012 | Sano et al. | ..................... 188/2 D |
| 2007/0199775 | A1 * | 8/2007 | Yasukawa | ..................... 188/73.1 |
| 2007/0284939 | A1 * | 12/2007 | Charles et al. | ................ 303/152 |
| 2009/0224751 | A1 * | 9/2009 | Budde et al. | ............. 324/207.17 |
| 2011/0101968 | A1 * | 5/2011 | Brands et al. | ............ 324/207.17 |

FOREIGN PATENT DOCUMENTS

| | | |
|---|---|---|
| DE | 10234848 A1 | 2/2004 |
| EP | 1898517 A2 | 3/2008 |
| EP | 1997703 A2 | 12/2008 |
| FR | 2945680 A1 | 11/2010 |

* cited by examiner

*Primary Examiner* — Melody Burch
(74) *Attorney, Agent, or Firm* — Sughrue Mion, PLLC

(57) ABSTRACT

A braking actuator for a brake of an aircraft, the actuator comprising:
  an electric motor;
  a pusher actuated by the motor; and
  a position sensor for sensing the position of the movable portion of the motor and provided with transmitter and receiver members.
The motor has first and second exciters adapted to move the movable portion of the motor and adapted to be powered independently from each other. The transmitter member of the position sensor comprises first and second transmitters adapted to be powered independently, and the receiver member generates the signal representative of position on being excited by at least one of the transmitters.

9 Claims, 2 Drawing Sheets

ELECTROMECHANICAL ACTUATOR WITH DUAL EXCITATION

The present invention relates to the field of brakes for aircraft wheels, and in particular to the field of electromechanical actuators adapted to actuate such brakes.

Electromechanical brake actuators are known that comprise a plurality of actuators, each having a casing that integrates:

- an electric motor provided with a stationary portion and a movable portion;
- a pusher movable in translation relative to the casing along a pusher travel axis;
- mechanical means for transforming a travel movement of the movable portion into a movement in translation of the pusher; and
- a position sensor for sensing the position of the movable portion relative to the stationary portion.

The stationary portion of the motor carries an exciter member adapted to cause the movable portion to move relative to said stationary portion when said exciter member is electrically powered. The sensor is generally of the inductive type and comprises a transmitter member and a receiver member, the transmitter member being adapted, when electrically powered, to excite said receiver member, which responds by generating one or more signals representative of the position of the movable portion relative to the stationary portion.

This type of actuator is generally integrated in a braking architecture that delivers electrical power to the actuators and that receives the information from the sensor in order to control an inverter for powering the motor of the actuator, thereby ensuring that the actuators apply a given braking force in response to a braking setpoint.

Unfortunately, in the event of a failure of one of the components of the actuator or of its control means, there is a risk of the failure being common to a plurality of actuators and leading to a massive failure that compromises the ability of the aircraft to brake.

It is known to solve that problem by proposing that a given aircraft makes use of actuators of different technologies, such that a breakdown affecting actuators of one of the types does not run the risk of harming the actuators of the other type. Nevertheless, such a solution is very expensive since it requires two types of actuator to be developed and requires distinct sets of parts to be managed.

OBJECT OF THE INVENTION

An object of the invention is to propose an actuator that makes it possible to reduce the risk of a common mode failure, while avoiding the need to develop two distinct types of actuator.

SUMMARY OF THE INVENTION

To this end, the invention provides a braking actuator for an aircraft brake, the actuator comprising a casing integrating:

- an electric motor comprising a stationary portion and a movable portion that is movable relative to the stationary portion; the stationary portion carrying an exciter member adapted to drive the movement of the movable portion when the exciter member is electrically powered;
- a pusher that is movable in translation relative to the casing along a pusher travel axis;
- mechanical means for transforming travel movement of the movable portion of the motor into movement in translation of the pusher; and
- a position sensor for sensing the position of the movable portion relative to the stationary portion; the position sensor comprising a transmitter member and a receiver member, the transmitter member being adapted, when powered electrically, to excite said receiver member at least when the movable portion is moving relative to the stationary portion, the receiver member being adapted to generate at least one signal representative of the position of the movable portion when said receiver member is excited by said transmitter member.

According to the invention:

- the exciter member of the motor comprises at least first and second exciters, each exciter being adapted, when powered, to drive the movement of the movable portion relative to the stationary portion, the exciters being arranged to be capable of being powered electrically independently from each other; and
- the transmitter member of the position sensor comprises at least first and second transmitters, each transmitter being adapted, on being powered, to cause at least one signal representative of the position of the movable portion to be sent by the receiver, the transmitters being arranged to be capable of being electrically powered independently of each other.

Thus, the braking actuator of the invention makes it possible to reduce the risk of a malfunction of the braking function since it provides:

- redundancy of the electrical excitation in the exciter member of the motor that enables the movable portion to be moved relative to the stationary portion; and
- redundancy in signal transmission by the position sensor for sensing the position of the movable portion.

Thus, the actuator of the invention can continue to function and control the movement of the movable pusher:

- even if any one of the exciters is no longer functional (e.g. because its electrical power supply has failed and/or if one of the exciters is damaged); and/or
- even if any of the transmitters of the position sensor is no longer functional (e.g. because its electrical power supply has failed and/or if said transmitter has intrinsically failed).

This arrangement makes it possible to establish operation that is much more reliable. It suffices to ensure that the power supplies to the two exciters and the power supplies to the two transmitters are distinct (internal and/or external relative to the actuator). Thus, a common failure of the first exciter in all or some of the actuators can easily be compensated by using the second exciter. This reduces the risk that a failure affecting the first exciters will disturb the power supply to the second exciters, since the power supply to the second exciters is not connected to the first exciters. The same applies to the transmitters of the position sensor. A common breakdown of the first transmitters will not prevent the second transmitters being used, and therefore will not prevent a signal representative of the position of the movable portion relative to the stationary portion being provided, as is necessary in order to control the motor.

With such actuators, and as described below, provision may be made for:

- the power supply of the exciters to be either internal to the actuator and/or external to the actuator; and/or
- the power supply of the transmitters to be either internal to the actuator and/or external to the actuator.

Provision may also be made for the exciters of the motor to be powered simultaneously, e.g. in order to generate torque greater than can be generated if only one of the two exciters is being powered at a given moment.

Provision may also be made for the transmitters to be powered simultaneously in order to improve the accuracy with which the position of the movable portion is measured relative to the stationary portion.

The invention thus makes it possible to improve the availability of the function for actuating an aircraft brake.

In order to implement the invention, as described below, arrangements are preferably made for the stationary portion to be a stator and the movable portion to be a rotor mounted to rotate relative to the stator. Arrangements are also made to ensure that the mechanical means for transforming a travel movement are adapted to transform rotation of the rotor into a movement in translation of the pusher and for the position sensor to be a sensor for sensing the angular position of the rotor relative to the stator.

BRIEF DESCRIPTION OF THE DRAWINGS

The invention can be better understood in the light of the following detailed description of a particular embodiment given by way of non-limiting indication and with reference to the accompanying drawings, in which.

DETAILED DESCRIPTION OF THE INVENTION

The invention is shown and described in detail herein in an application to a brake of a fuselage undercarriage. Naturally, such an application is not limiting and the invention may be applied to other undercarriages.

Figure 1:
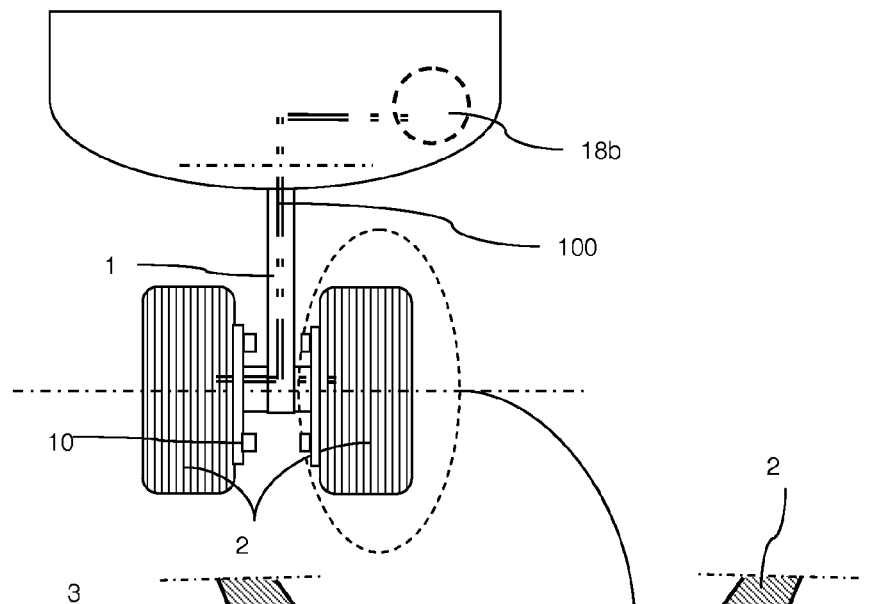
FIG. 1 is a diagrammatic view of a portion of an aircraft having an undercarriage carrying wheels fitted with brakes having actuators of the invention.

As shown in FIG. 1, the undercarriage 1 is hinged to the fuselage of the aircraft and includes a bottom end carrying wheels 2. Each of these wheels 2 is mounted to rotate on an axle of the undercarriage and is braked by means of a corresponding brake 3 that extends in part inside the wheel.

Figure 2:
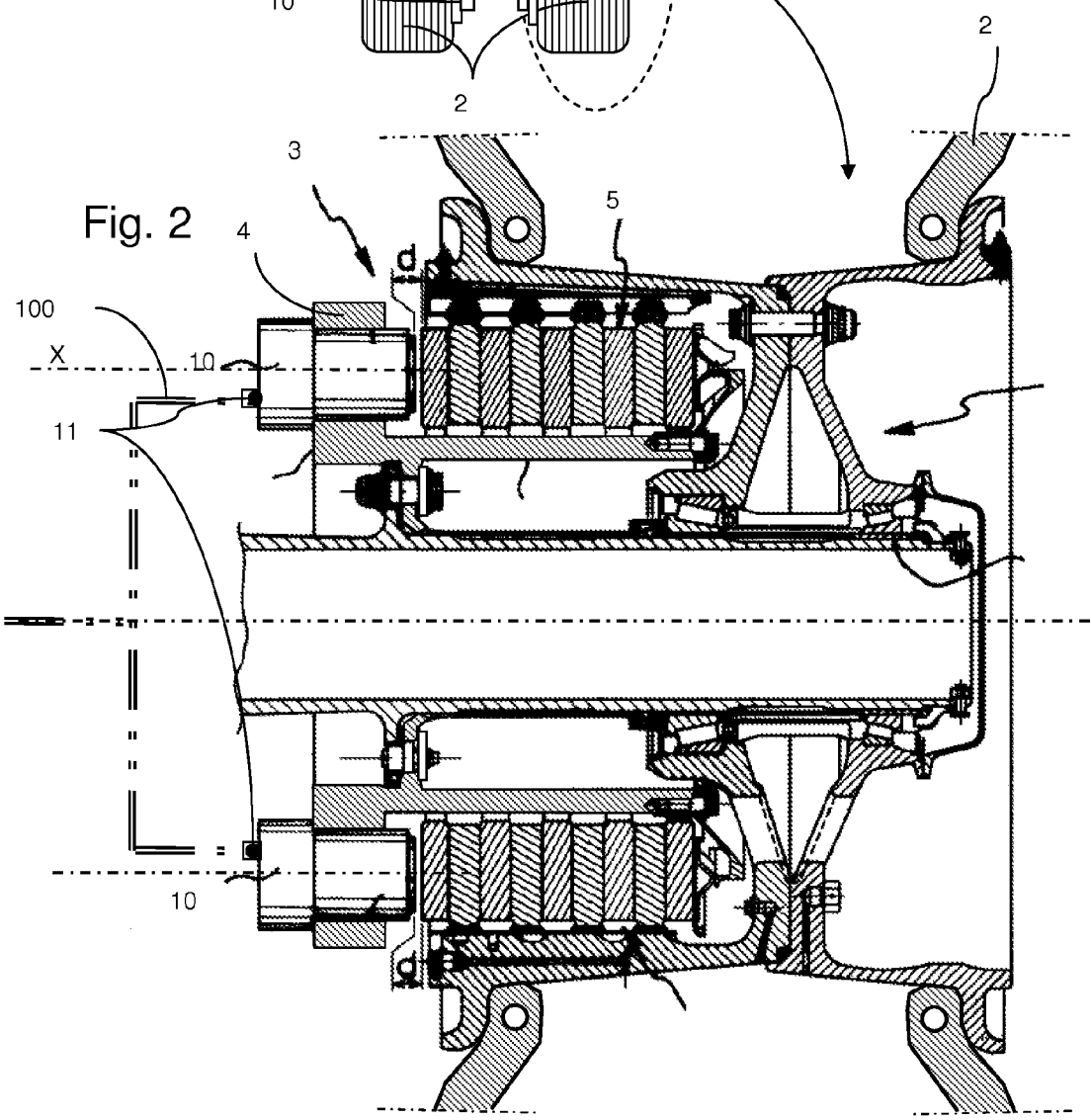
FIG. 2 is a section view of a portion of one of the FIG. 1 wheels.

As shown in FIG. 2, the brake 3 has a plurality of brake actuators 10 (only two can be seen) carried by a ring 4. The actuators 10 extend facing a stack of disks 5 suitable for being selectively pressed together by the actuators 10 in order to brake the wheel associated with the brake. The actuators 10 are connected to the remainder of the braking architecture by electric cables 100 coming from the fuselage and going down along the undercarriage, these cables terminating in a connector 11 of the actuator 10. These cables serve both to power the various electrical components of the actuator and to send or return the signals needed for managing the actuator, as described in greater detail below.

Figure 3:
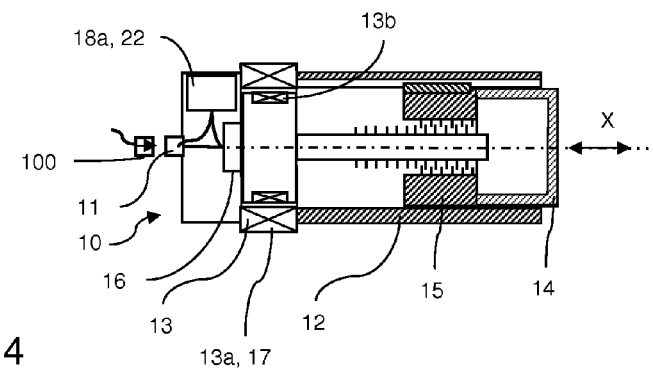
FIG. 3 is a diagrammatic view of an actuator of the invention.

The actuator is described in greater detail with reference to FIGS. 3 and 4. As shown initially in FIG. 3, the actuator 10 comprises a casing 12 incorporating:

an electric motor 13 having a stator 13a and a rotor 13b mounted to rotate relative to the stator 13a;
a pusher 14 movable in translation along a pusher travel axis X; and
a connection member 15 for transforming rotation of the rotor 13b into travel movement of the pusher 14 along said pusher travel axis X.

The actuator also has an angle position sensor 16 for sensing the angular position of the rotor 13b relative to the stator 13a and adapted to issue one or more signals representative of the angular position of the rotor. These signals are useful for controlling an inverter that powers the motor.

Figure 4:
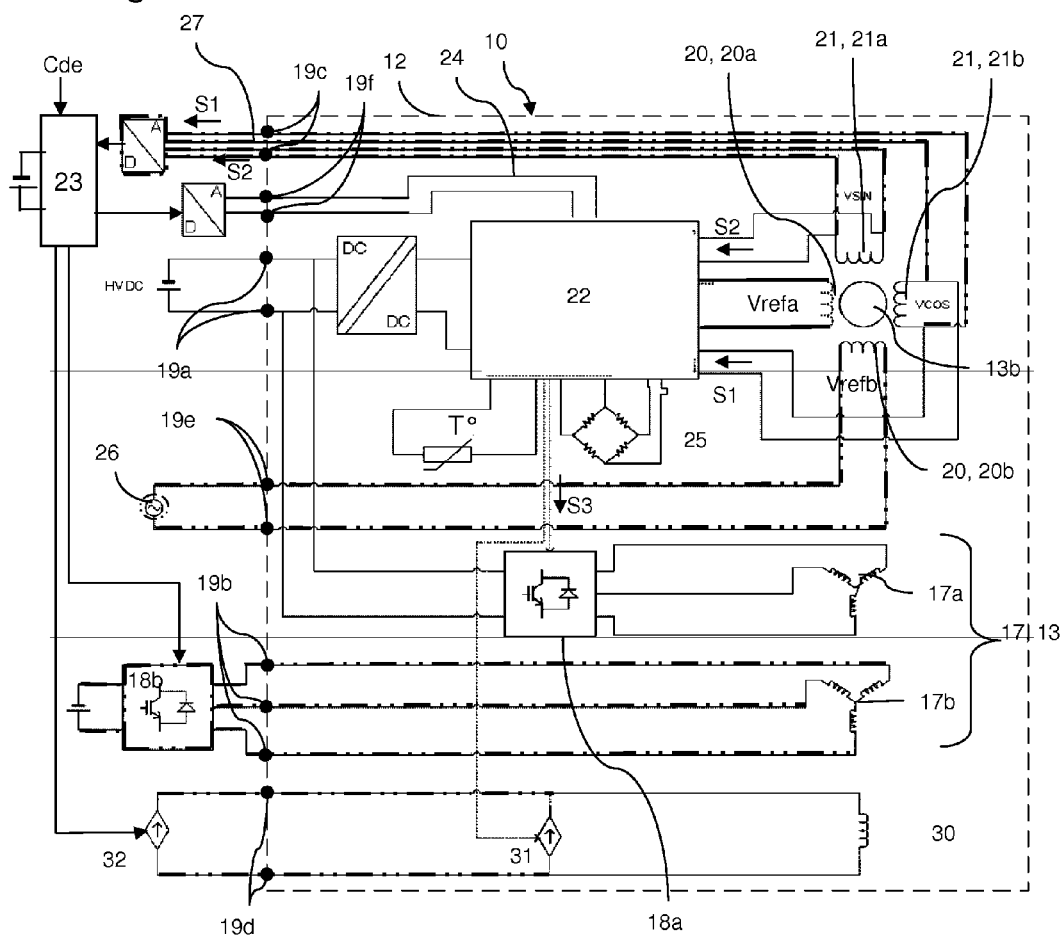
FIG. 4 is an electrical schematic diagram of the FIG. 3 actuator together with a portion of the associated braking architecture.

As shown in FIG. 4, the stator 13a carries an exciter member 17 adapted to generate a rotating magnetic field and thus cause the rotor 13b to rotate relative to the stator 13a when the exciter member 17 is electrically powered.

According to the invention, the exciter member 17 comprises first and second exciters 17a and 17b, each adapted to generate a rotating magnetic field so as to cause the rotor 13b to rotate relative to the stator 13a when powered. The exciters 17a and 17b are adapted to be powered independently from each other. By way of example, each of these exciters 17a and 17b is constituted by three coils having a common terminal and three power supply terminals adapted to be subjected to three-phase voltages delivered by an inverter. When powered, each exciter 17a, 17b is capable on its own of causing the rotor 13b to rotate.

Advantageously, the actuator 10 includes an internal inverter 18a integrated therein that powers the first exciter 17a. The other exciter 17b is powered by an external inverter 18b, e.g. placed in the hold of the aircraft and powering the second exciter 17b via the cable 100.

The internal inverter 18a and the external inverter 18b are controlled by means of signals issued by the angle position sensor 16. More precisely, the position sensor 16 is of the inductive type in this example, and it includes a transmitter member 20 that influences a first receiver 21a and a second receiver 21b (specifically the first and second receivers are formed respectively by first and second receiver coils), which receivers transmit signals S1 and S2 that are phase-offset from each other by 90 degrees and that depend on the angular position of the rotor 13. By combining these two signals, it is possible to determine the angular position of the rotor, in well-known manner. For this purpose, the actuator 10 has a processor unit 22, e.g. a microprocessor associated with a memory, that receives the signals S1 and S2 and that reconstitutes information about the angular position of the rotor 13b in order to generate a control signal S3 for controlling the internal inverter 18a (also referred to as the integrated inverter 18a). Thus, the integrated processors unit 22 controls the integrated inverter 18a as a function of at least one of the signals S1 and S2, each of which is representative of the angular position of the rotor 13b, and said first exciter 17a is powered by the integrated inverter 18a as a function of these signals S1 and S2.

Furthermore, the signals S1 and S2 are also sent to an external calculation unit 23 for use thereby in order to control the external inverter 18b. Preferably, the signals S1 and S2 are delivered to the external calculation unit 23 by means of a bus 27 going up along the undercarriage.

According to the invention, the transmitter member 20 has both a first transmitter 20a and a second transmitter 20b that is independent from the first transmitter 20a. The first transmitter is constituted by a first transmitter coil and the second transmitter is constituted by a second transmitter coil. The first transmitter 20a is powered by an alternating voltage Vrefa directly by the integrated processor unit 22, which is itself powered by a direct current (DC) source of the aircraft. The second transmitter 20b is powered with an alternating voltage Vrefb independently of the first transmitter and by an alternating current (AC) source of the aircraft.

Thus, the loss of the integrated processor unit 22 does not compromise the operation of the actuator, since its motor can be powered by the external inverter 18b and controlled by the external calculation unit 23 receiving the signals S1 and S2 generated by the position sensor in which the second transmitter 20b is powered by an external source.

According to a particular aspect of the invention, the integrated processor unit 22 is connected to an integrated temperature gauge T° serving to monitor the temperature of the motor, and also to a strain gauge 25 making it possible to determine the force exerted by the pusher on the stack of disks. The signals generated by these gauges enable the integrated processor unit 22 to implement algorithms for controlling the integrated or internal inverter 18a, e.g. for the purpose of providing forced servo-control, or indeed for limiting the current flowing through the motor if its temperature exceeds a predetermined threshold.

According to another particular aspect of the invention, the actuator is fitted with a blocking member 30 for blocking the pusher 14 in position, thereby enabling a parking brake function to be provided.

The blocking member 30 is preferably bistable, and it is controlled by an internal relay 31 that is adapted to cause the pusher 14 to be blocked on receiving a blocking control signal such as a first pulse, and to release the pusher 14 on receiving an unblocking control signal such as a second pulse, the control signals being generated by the integrated processor unit 21 in response to receiving an order to apply the parking brake or an order to release it.

The blocking member 30 may also be monostable, in which case it is possible to select blocking and unblocking control signals that comprise respective predetermined levels of current.

According to yet another particular aspect of the invention, an external relay 32 is arranged in parallel with the internal relay 31, it being possible for the external relay 32 to be controlled independently of the internal relay 31 in order to control the blocking member 30.

Thus, the function of controlling blocking of the brake is made secure in redundant and symmetrical manner, thereby reducing any risk of this control failing as a result of a common failure mode.

For reasons of ease of installation and of disassembly of the integrated actuator 10 on the brake ring, the various connection terminals 19a, 19b, 19c, 19d, 19e, and 19f for signals and for powering the actuator (connection to the external inverter, connection to the external relay, connection to the various power sources, connection to the serial bus, . . . ) are grouped together in a single connector 11 forming part of the actuator 1.

In particular, as shown in FIG. 4, the integrated inverter 18a and the first transmitter 20a of the transmitter member 20 of the sensor 16 are connected to first terminals 19a of the actuator 10 in such a manner as to be capable of being powered by a common power source external to the actuator. The second exciter 17b is wired together with the second terminals 19b of the actuator so as to be capable of being powered by an inverter 18b that is external to the actuator 10.

The receiver member of the sensor is connected to third terminals 19c of the actuator so as to be capable of sending said at least one signal S1, S2 representative of the angular position of the rotor to the external calculation unit 23 so that it can control said external inverter 18b as a function of at least one of the signals S1, S2 representative of the angular position of the rotor.

FIG. 4 also shows external blocking terminals 19b accessible from outside the actuator 10 and serving to convey blocking and unblocking control signals to the blocking member 30 via an external relay 32 controlled by the eternal calculation unit 23 and without passing via the internal relay 31.

There can also be seen external terminals 19e connecting the second transmitter 20b to an external power source 26 for exciting the transmitter 20b.

Finally, there can be seen terminals 19f forming part of a serial port 24 of the actuator 10. These terminals 19f are accessible from outside the actuator 10 and they serve to exchange data between the external calculation unit 23 and the integrated processor unit 22 which is connected to the serial port 24.

By way of example, provision may be made for a target value representative of the power supply current to the exciter 17a to be transmitted from the external calculation unit 23 to the integrated processor unit 22 that generates the signal S3 for controlling the internal inverter 18a as a function of said target value.

It should be observed that in an embodiment of the invention, the serial port 24, which is connected via terminals 19f firstly to the integrated processor unit 22 and secondly to the external calculation unit 23, may suffice for sending to the calculation unit 23 the signals from the set of sensors connected to the integrated processor unit 22. Specifically, the serial port 24 may be adapted to send signals/information coming from the position sensor 16, the strain gauge 25, and the temperature gauge T°, and possibly also from gauges delivering signals representative of the currents delivered to each of the exciters of the exciter member 17.

The invention is not limited to the above description, but on the contrary covers any variant coming within the ambit defined by the claims.

In particular, although the motor in the described actuator has stationary and moving portions in the form respectively of a stator and a rotor, the invention applies equally to an actuator having a linear motor, in which the moving portion moves linearly relative to the stationary portion.

What is claimed is:

1. A braking actuator for an aircraft brake, the actuator comprising:
  a casing integrating:
    an electric motor comprising a stationary portion and a movable portion that is movable relative to the stationary portion, the stationary portion carrying an exciter member adapted to drive the movement of the movable portion when the exciter member is electrically powered;
    a pusher that is movable in translation relative to the casing along a pusher travel axis;
    mechanical means for transforming travel movement of the movable portion of the motor into movement in translation of the pusher; and
    a position sensor for sensing the position of the movable portion relative to the stationary portion; the position sensor comprising a transmitter member and a receiver member, the transmitter member being adapted, when powered electrically, to excite said receiver member at least when the movable portion is moving relative to the stationary portion, the receiver member being adapted to generate at least one signal representative of the position of the movable portion when said receiver member is excited by said transmitter member;
  wherein:
    the exciter member of the motor comprises at least first and second exciters, each exciter being adapted, when powered, to drive the movement of the movable portion relative to the stationary portion, the exciters being arranged to be capable of being powered electrically independently from each other;

the transmitter member of the position sensor comprises at least first and second transmitters, each transmitter being adapted, on being powered, to cause at least one signal representative of the position of the movable portion to be sent by the receiver member, the transmitters being arranged to be capable of being electrically powered independently of each other;

the actuator further includes an integrated inverter inside the casing of the actuator and being adapted to power said first exciter, said integrated inverter being connected to first terminals of the actuator so as to be capable of being powered by a common power source external to the actuator; and the second exciter is wired to second terminals of the actuator so as to be powerable by an external inverter external to the actuator.

2. A braking actuator according to claim 1, wherein the stationary portion is a stator and the movable portion is a rotor mounted to rotate relative to the stator, wherein the mechanical means for transforming travel movement are adapted to transform rotation of the rotor into a movement in translation of the pusher, and wherein said position sensor is an angular position sensor for sensing the angular position of the rotor relative to the stator.

3. A braking actuator for aircraft according to claim 2, wherein the angular position sensor is an inductive sensor:
the transmitter member of the sensor comprising first and second transmitter coils respectively forming the first and second transmitters; and
the receiver member of the sensor including first and second receivers each formed by a receiver coil, the first and second receivers being adapted to generate respective first and second signals representative of the angular position of the rotor when at least one of said transmitters is powered with an alternating voltage.

4. An actuator according to claim 2, wherein said actuator includes an integrated processor unit inside said casing of the actuator and suitable for controlling said integrated inverter as a function of at least one signal representative of the angular position of the rotor.

5. An actuator according to claim 1, wherein the stationary portion is a stator and the movable portion is a rotor mounted to rotate relative to the stator, wherein the mechanical means for transforming travel movement are adapted to transform rotation of the rotor into a movement in translation of the pusher, and wherein said position sensor is an angular position sensor for sensing the angular position of the rotor relative to the stator, wherein said at least one signal representative of the position of the movable portion is a signal representative of the angular position of the rotor, wherein said receiver member of the sensor is connected to third terminals of the actuator in such a manner as to be capable of sending said signal representative of the angular position of the rotor to an external calculation unit external to the actuator, which unit is suitable for controlling said external inverter as a function of the signal representative of the angular position of the rotor.

6. A braking actuator for an aircraft brake, the actuator comprising:
a casing integrating:
an electric motor comprising a stationary portion and a movable portion that is movable relative to the stationary portion, the stationary portion carrying an exciter member adapted to drive the movement of the movable portion when the exciter member is electrically powered;
a pusher that is movable in translation relative to the casing along a pusher travel axis;
mechanical means for transforming travel movement of the movable portion of the motor into movement in translation of the pusher; and
a position sensor for sensing the position of the movable portion relative to the stationary portion; the position sensor comprising a transmitter member and a receiver member, the transmitter member being adapted, when powered electrically, to excite said receiver member at least when the movable portion is moving relative to the stationary portion, the receiver member being adapted to generate at least one signal representative of the position of the movable portion when said receiver member is excited by said transmitter member;

wherein:
the exciter member of the motor comprises at least first and second exciters, each exciter being adapted, when powered, to drive the movement of the movable portion relative to the stationary portion, the exciters being arranged to be capable of being powered electrically independently from each other;
the transmitter member of the position sensor comprises at least first and second transmitters, each transmitter being adapted, on being powered, to cause at least one signal representative of the position of the movable portion to be sent by the receiver member, the transmitters being arranged to be capable of being electrically powered independently of each other,
the stationary portion is a stator and the movable portion is a rotor mounted to rotate relative to the stator, and
the mechanical means for transforming travel movement are adapted to transform rotation of the rotor into a movement in translation of the pusher, and wherein said position sensor is an angular position sensor for sensing the angular position of the rotor relative to the stator, and
wherein
it includes a blocking member for blocking the pusher in position, said blocking member being adapted to cause the pusher to be blocked on receiving a blocking control signal and to release said pusher on receiving an unblocking control signal, the blocking member being:
firstly electrically connected to an internal relay for controlling the blocking member; and
secondly electrically connected to external blocking terminals of said actuator so as to be capable of receiving the blocking and unblocking control signals via said external blocking terminals without passing via said internal relay.

7. An aircraft brake including at least one actuator according to claim 1, the brake further including a stack of disks suitable for being selectively pressed together by the actuator in order to brake a wheel associated with the brake.

8. A braking device for aircraft including at least one brake comprising (1) a stack of disks suitable for being selectively pressed together by the actuator in order to brake a wheel associated with the brake, (2) a braking actuator for an aircraft brake, the actuator comprising:
a casing integrating:
an electric motor comprising a stationary portion and a movable portion that is movable relative to the stationary portion, the stationary portion carrying an exciter member adapted to drive the movement of the movable portion when the exciter member is electrically powered;

a pusher that is movable in translation relative to the casing along a pusher travel axis;

mechanical means for transforming travel movement of the movable portion of the motor into movement in translation of the pusher; and a position sensor for sensing the position of the movable portion relative to the stationary portion; the position sensor comprising a transmitter member and a receiver member, the transmitter member being adapted, when powered electrically, to excite said receiver member at least when the movable portion is moving relative to the stationary portion, the receiver member being adapted to generate at least one signal representative of the position of the movable portion when said receiver member is excited by said transmitter member;

wherein:

the exciter member of the motor comprises at least first and second exciters, each exciter being adapted, when powered, to drive the movement of the movable portion relative to the stationary portion, the exciters being arranged to be capable of being powered electrically independently from each other;

the transmitter member of the position sensor comprises at least first and second transmitters, each transmitter being adapted, on being powered, to cause at least one signal representative of the position of the movable portion to be sent by the receiver member, the transmitters being arranged to be capable of being electrically powered independently of each other, the stationary portion is a stator and the movable portion is a rotor mounted to rotate relative to the stator, and the mechanical means for transforming travel movement are adapted to transform rotation of the rotor into a movement in translation of the pusher, and wherein said position sensor is an angular position sensor for sensing the angular position of the rotor relative to the stator, and further comprising:

an external inverter external to the actuator and connected to the second exciter in order to power it selectively; and an integrated inverter integrated in the actuator and connected to the first exciter of the motor in order to power it.

9. An actuator according to claim 1, wherein the integrated inverter and the first transmitter of the transmitter member of the sensor are connected to said first terminals of the actuator so as to be capable of being powered by said common power source external to the actuator.

* * * * *